July 22, 1941. V. J. S. RUSSELL 2,250,395

SYNCHRONOUS ELECTRIC MOTOR

Filed May 18, 1940

Inventor,
V. J. S. Russell by: Glascock Downing & Seebold
Attys.

Patented July 22, 1941

2,250,395

UNITED STATES PATENT OFFICE 2,250,395

SYNCHRONOUS ELECTRIC MOTOR

Victor James Samuel Russell, Cricklewood, London, England, assignor to S. Smith & Sons (Motor Accessories) Limited, Cricklewood, London, England Application May 18, 1940, Serial No. 336,048
In Great Britain May 10, 1939

3 Claims. (Cl. 172—275)

This invention relates to small synchronous electric motors of the kind in which a multipolar permanent magnet rotor is combined with a wound stator, and has in combination with it a resiliently mounted magnetic member or members situated in or adjacent to a space or spaces between the rotor poles for ensuring self-starting of the motor. Such a motor is described in British patent specification No. 394,784, and is suitable for use in an electric clock or for any other like purpose.

The object of the present invention is to provide improved means for ensuring reliable self-starting of a motor of the kind specified above.

The invention comprises at least one oscillatory arm mounted on the rotor, and a rubber bush forming a resilient connection between the arm and rotor, the said arm having a magnetic outer end piece situated in the vicinity of a space between the rotor poles, and being so mounted that its centre of oscillation is situated coincidently with the rotor axis so that the said arm can oscillate without the said end piece coming into contact with the inner periphery of the stator.

In the accompanying sheet of explanatory drawings.

Figure 1:
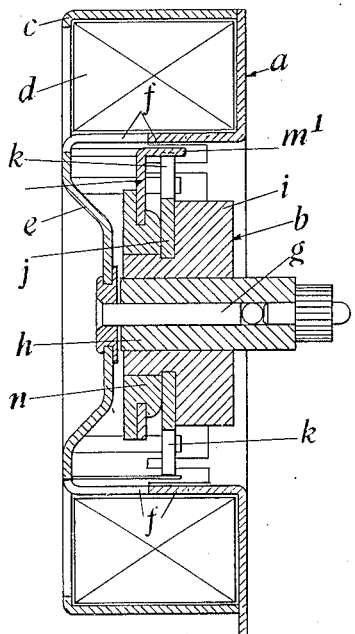
Figures 1 and 2 are respectively a sectional side elevation and a sectional end elevation of a small synchronous electric motor embodying the invention.
Figure 3:
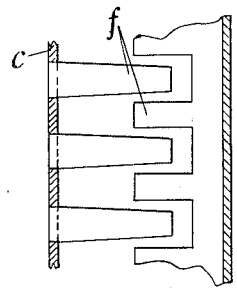
Figure 3 is a fragmentary view illustrating the form of the stator poles shown in Figures 1 and 2.
Figure 2:
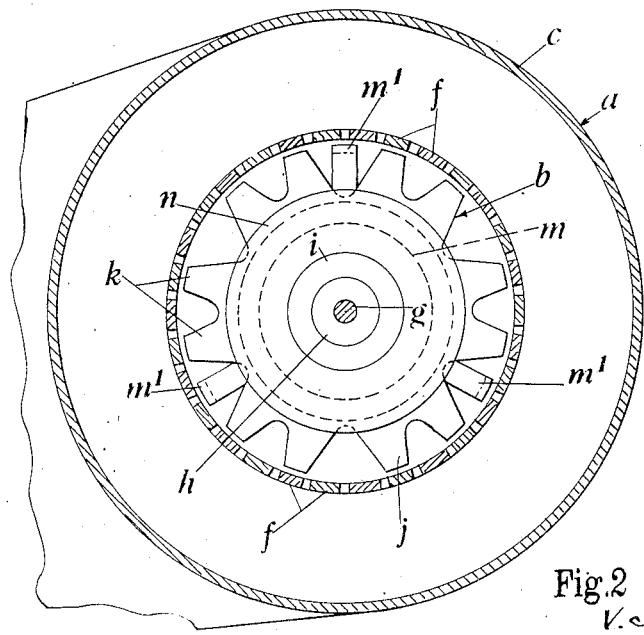

The motor shown in the drawing comprises a stator $a$ and a rotor $b$. The stator $a$ is made from sheet iron parts shaped to provide an annular housing $c$ for an annular exciting winding $d$. One of the said parts is formed integrally with an end wall $e$. The inner periphery of the housing $c$ has formed around it two sets of intermeshing poles $f$ separated by an air gap. To the centre of the wall $e$ is secured one end of a spindle $g$ for supporting the rotor $b$ coaxially within the space enclosed by the inner periphery of the housing $c$. The rotor $b$ comprises a hollow shaft $h$ which can be freely mounted on the spindle $g$, a body part $i$ secured on the shaft, and an annular disc-like permanent magnet $j$ secured on the body part coaxially with the shaft, the magnet having a plurality of radial poles $k$ adapted to co-operate with the stator poles $f$. In the example illustrated the magnet poles $k$ are arranged so that alternate pairs are of opposite polarity.

In applying the present invention to the known form of motor above described, I employ an iron spider comprising an annular part or ring $m$ from which extend symmetrically three radial arms $m^1$. This spider is resiliently attached to the body part $i$ of the rotor and concentrically with the said body part by means of a rubber bush $n$, so that the centre of oscillation of the spider is made to coincide with the rotor axis. The annular part $m$ of the spider is embedded in the rubber bush $n$, and the latter is tightly mounted on the body part $i$ as shown. At their outer ends the arms $m^1$ of the spider may be bent over at right angles as shown, or provided with end pieces, and adapted to shunt part of the stator flux. The outer ends or end pieces of the spider arms are arranged within or adjacent to spaces between the magnet poles $k$, so that should the rotor $b$ come to rest with the magnet poles opposite to the stator poles $f$ the outer ends or end pieces of the spider arms will lie opposite to the spaces between the adjacent stator poles. If current is now supplied to the winding $d$ the spider $m$, $m^1$ will be caused to oscillate under the action of the magnetic field, and this oscillation will cause sufficient movement of the rotor $b$ to bring the latter into action. By virtue of the fact that the oscillation of the spider $m$ takes place about an axis coincident with the axis of the rotor $b$ the outer ends or end pieces of the spider arms cannot move into contact with the inner periphery of the housing $c$.

By the improvement forming the subject of the present invention risk of noise due to striking of the oscillatory member against the stator due to large amplitude of vibratory movement is eliminated.

Having thus described my invention what I claim as new and desire to secure by Letters Patent is:

1. A small synchronous electric motor comprising the combination of an annular wound stator, a multi-polar magnet rotor mounted within the stator, at least one oscillatory arm mounted on the rotor, and a rubber bush forming a resilient connection between the arm and rotor, the said arm having a magnetic outer end piece situated in the vicinity of a space between the rotor poles, and being so mounted that its centre of oscillation is situated coincidently with the rotor axis so that the said arm can oscillate without the said end piece coming into contact with the inner periphery of the stator.

2. A small synchronous electric motor comprising the combination of an annular wound stator, a multi-polar magnet rotor mounted within the stator, an oscillatory multi-armed spider mounted on the rotor, and a rubber bush forming a resilient connection between the spider and rotor, the arms of the spider having magnetic outer end pieces situated in the vicinity of spaces between the rotor poles, and the spider being so mounted that its centre of oscillation is situated coincidently with the rotor axis so that the spider can oscillate without the said end pieces coming into contact with the inner periphery of the stator.

3. A small synchronous electric motor comprising the combination of an annular wound stator, a multi-polar magnet rotor mounted within the stator, an oscillatory multi-armed spider mounted on the rotor, and a rubber bush forming a resilient connection between the spider and rotor, the arms of the spider having bent over magnetic outer ends situated in spaces between the rotor poles, and the spider being so mounted that its centre of oscillation is situated coincidently with the rotor axis so that the spider can oscillate without the said ends coming into contact with the inner periphery of the stator

VICTOR JAMES SAMUEL RUSSELL.